United States Patent
Xu et al.

(10) Patent No.: US 12,035,858 B2
(45) Date of Patent: Jul. 16, 2024

(54) METHOD AND DEVICE FOR DETERMINING REGION TO BE CLEANED, DUST CLEANING APPARATUS, TERMINAL FOR CONTROLLING CLEANING ROBOT, AND STORAGE MEDIUM

(71) Applicant: BOE TECHNOLOGY GROUP CO., LTD., Beijing (CN)

(72) Inventors: Jingtao Xu, Beijing (CN); Jianwen Suo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 712 days.

(21) Appl. No.: 17/288,778

(22) PCT Filed: Jun. 17, 2020

(86) PCT No.: PCT/CN2020/096579
§ 371 (c)(1),
(2) Date: Apr. 26, 2021

(87) PCT Pub. No.: WO2020/253724
PCT Pub. Date: Dec. 24, 2020

(65) Prior Publication Data
US 2021/0406584 A1 Dec. 30, 2021

(30) Foreign Application Priority Data
Jun. 18, 2019 (CN) .......................... 201910525164.9

(51) Int. Cl.
G06V 10/25 (2022.01)
A47L 9/28 (2006.01)
A47L 11/40 (2006.01)
G06F 18/2411 (2023.01)
G06V 10/56 (2022.01)

(52) U.S. Cl.
CPC ......... *A47L 11/4061* (2013.01); *A47L 9/2826* (2013.01); *G06F 18/2411* (2023.01); *G06V 10/25* (2022.01); *G06V 10/56* (2022.01); *A47L 2201/06* (2013.01)

(58) Field of Classification Search
CPC .... G06V 10/25; G06V 10/22; G06F 18/2411; A47L 2201/06
See application file for complete search history.

(56) References Cited

U.S. PATENT DOCUMENTS

| 10,511,256 | B2* | 12/2019 | Jiang | ....................... B08B 13/00 |
| 2011/0089348 | A1 | 4/2011 | Finarov et al. | |
| 2022/0049877 | A1* | 2/2022 | Roogi | ..................... F24S 40/20 |

FOREIGN PATENT DOCUMENTS

| CN | 106546601 A | 3/2017 |
| CN | 107229932 A | 10/2017 |

* cited by examiner

*Primary Examiner* — Phuoc Tran (57) ABSTRACT

The present disclosure provides a method and a device for determining a region to be cleaned, a dust cleaning apparatus, a terminal for controlling a cleaning robot, and a storage medium. The method includes: determining, in an initial image of a photovoltaic panel, a gap region associated with a gap between cell pieces; assigning first preset values to pixel values of pixels located in the gap region of the initial image to obtain a first value-assigned image, wherein the first preset values are pixel values of pixels in the initial image that correspond to the cell pieces.

20 Claims, 7 Drawing Sheets

METHOD AND DEVICE FOR DETERMINING REGION TO BE CLEANED, DUST CLEANING APPARATUS, TERMINAL FOR CONTROLLING CLEANING ROBOT, AND STORAGE MEDIUM

CROSS-REFERENCE TO RELATED APPLICATION

The present application claims priority of Chinese Patent Application No. 201910525164.9, filed on Jun. 18, 2019, and the entire content disclosed by the Chinese patent application is incorporated herein by reference as part of the present application.

TECHNICAL FIELD

The embodiments of the present disclosure relate to a method and device for determining a region to be cleaned, a dust cleaning device, a terminal for controlling a cleaning robot, and a storage medium.

BACKGROUND

Because photovoltaic panels are exposed to the open air environment for a long time, it is inevitable that dust will fall on the surface of the photovoltaic panels, thereby blocking the light shining into the photovoltaic panels, thus affecting the power generation efficiency of the photovoltaic panel. Therefore, it is necessary to clean the dust on the surface of the photovoltaic panels.

SUMMARY

According to a first aspect of embodiments of the present disclosure, a method for determining a region to be cleaned is provided, comprising: determining a gap region belonging to a gap between solar cells in an initial image of a photovoltaic panel, wherein the photovoltaic panel comprises a plurality of solar cells; assigning pixel values of pixels in the gap region of the initial image to a first preset value to obtain a first assignment image, wherein the first preset value is a pixel value of a pixel, corresponding the solar cells, in the initial image; and determining a region to be cleaned with dust in the first assignment image, wherein determining the region to be cleaned with the dust in the first assignment image comprises: according to the pixel values of the pixels in the first assignment image, determining feature values of the pixels in the first assignment image; inputting the feature values into a preset classification model to determine whether the dust exists in the initial image; and determining the region to be cleaned according to connected dust pixels corresponding to the dust if the dust exists in the initial image.

Optionally, inputting the feature values into the preset classification model to determine whether the dust exists in the initial image comprises: dividing the first assignment image into a plurality of sub-regions; determining a texture feature vector according to a histogram of feature values of pixels in each sub-region; and inputting the texture feature vector into the preset classification model to determine whether the dust exists in the initial image.

Optionally, determining the region to be cleaned according to the connected dust pixels corresponding to the dust comprises: in pixels of the initial image, determining pixels, whose values of the texture feature vector are within a preset range, are the dust pixels corresponding to the dust; assigning pixel values of the dust pixels to a second preset value to obtain a second assignment image; and determining a connected region, comprising pixels with pixel values equal to the second preset value, in the second assignment image.

Optionally, determining the region to be cleaned according to the connected dust pixels corresponding to the dust further comprises: determining circumscribed rectangles of all connected regions as the region to be cleaned.

Optionally, determining the region to be cleaned according to the connected dust pixels corresponding to the dust, further comprises: determining a sub-circumscribed rectangle of each connected region; and determining circumscribed rectangles of all sub-circumscribed rectangles as the region to be cleaned.

Optionally, the feature values comprise a local binary pattern value.

Optionally, determining the gap region belonging to the gap between the solar cells in the initial image of the photovoltaic panel comprises: dividing the initial image into images of a plurality of color channels; determining whether pixel values of pixels at a same position in images of respective color channels are greater than a third preset value; determining that the pixels at the position in the initial image are gap pixels if the pixel values of the pixels at the same position in the images of respective color channels are greater than the third preset value; and determining the gap region according to all gap pixels in the initial image.

According to a second aspect of embodiments of the present disclosure, a device for determining a region to be cleaned is provided, comprising a processor configured to implement the method for determining the region to be cleaned according to the aforesaid method.

According to a third aspect of embodiments of the present disclosure, a dust cleaning device which includes the aforesaid device for determining a region to be cleaned is provided.

It should be understood that the above description and the following detailed description are only exemplary and explanatory, and the embodiments of the present disclosure are not limited to the present disclosure.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

The inventor realized that in order to automatically clean the dust on the surface of a photovoltaic panel, it is necessary to identify a region, where the dust exists on the surface of the photovoltaic panel, in collected images of the photovoltaic panel.

Embodiments of the present disclosure provide a method for determining a region to be cleaned, a device for determining the region to be cleaned, and a dust cleaning device, so as to solve the problem that gaps between solar cells are easily mistakenly identified as the dust in the case of identifying regions with dust on the surface of photovoltaic panels in related technologies.

Figure 1:
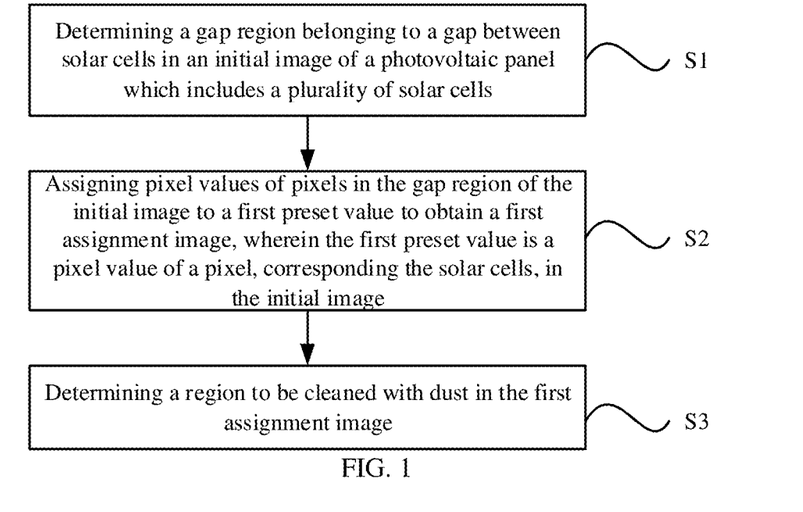
FIG. 1 is a schematic flow chart illustrating a method of a method for determining a region to be cleaned according to an embodiment of the present disclosure.

FIG. 1 is a schematic flow chart of a method for determining a region to be cleaned according to an embodiment of the present disclosure. The method for determining the region to be cleaned illustrated in the embodiment of the present disclosure can be applied to terminals, servers, robots and other devices, the terminals may include mobile terminals, such as mobile phones, tablet computers, wearable devices, etc., and the robots may include robots for cleaning photovoltaic panels.

As illustrated in FIG. 1, the method for determining the region to be cleaned may include steps S1-S3 as follows.

S1, determining a gap region belonging to a gap between solar cells in an initial image of a photovoltaic panel, wherein the photovoltaic panel includes a plurality of solar cells.

Figure 11A:
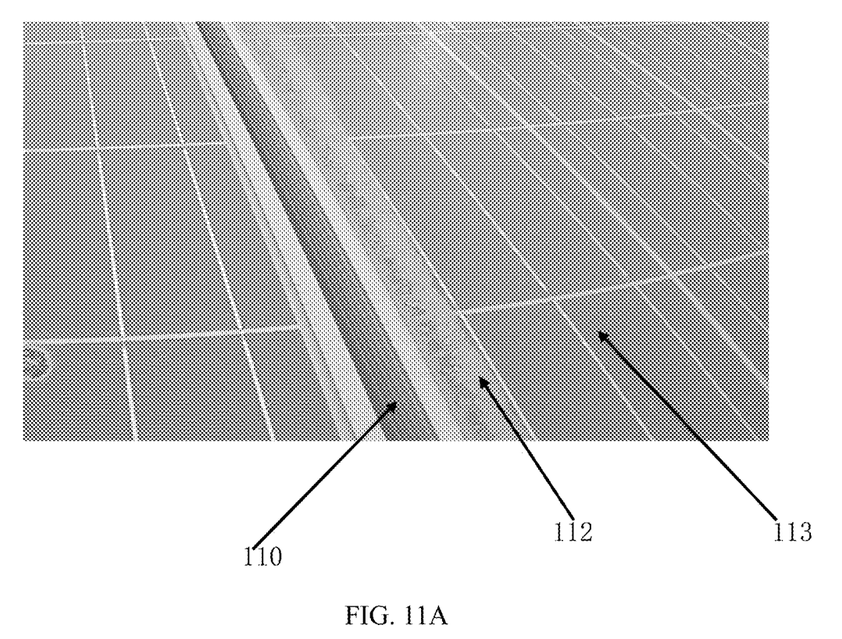
FIGS. 11A and 11B show an example of a photovoltaic panel, and show a gap between a dust region and a solar cell schematically.
Figure 11B:
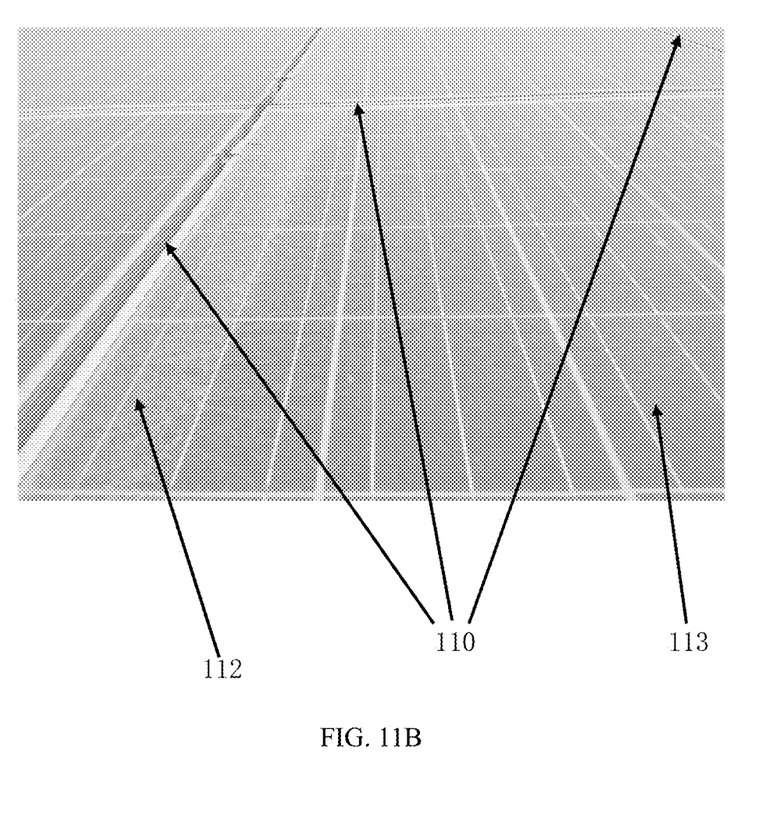

In an embodiment, as illustrated in FIG. 11, the photovoltaic panel may include a bottom plate (the material of the bottom plate is, for example, aluminum alloy, etc.), a plurality of solar cells 113 may be disposed on the bottom plate, a gap 110 may be formed between adjacent solar cells at a certain distance, and the bottom plate may be exposed at the gap. The method for determining the gap region will be explained in detail by examples later.

S2, assigning pixel values of pixels in the gap region of the initial image to a first preset value to obtain a first assignment image, wherein the first preset value is a pixel value of a pixel, corresponding the solar cells, in the initial image.

S3, determining a region to be cleaned with dust 112 in the first assignment image.

The first preset value can be determined in advance, for example, it can be a manually input value, or it can be obtained by weighted summation or averaging on the pixel values of the pixels, corresponding to the solar cells, in the initial image. The method for determining the first preset value can be selected as required, and the embodiments of the present disclosure are not limited in this aspect.

As illustrated in FIGS. 11A and 11B, there is a gap 110 between the solar cells 113 in the photovoltaic panel, the bottom plate is exposed at the gap 110, and the bottom plate is generally white, while the dust 112 is generally gray-white. Therefore, the pixel values of the pixels at the gap 110 is close to the pixel values of a dust region, where the dust 112 exists. Therefore, it is easy to mistakenly identify the gap 110 between the solar cells as the dust in the case of identifying the region where the dust 112 exists on the surface of the photovoltaic panel.

In an embodiment, the pixel values of the pixels in the gap region of the initial image is assigned to the first preset value, so that the pixel values of the pixels in the gap region in the obtained first assignment image are equal to the pixel values of the pixels, corresponding to a solar cell, in the initial image, that is, the pixel values of the pixels in the gap region in the first assignment image are the same as the pixel values of the pixels corresponding the solar cell.

Because in the first assignment image, the pixel values of the pixels in the gap region are the same as the pixel values of the pixels corresponding to the solar cell, there is a big difference between the pixel values of the pixels in the gap region and the pixel values of the pixels in the region to be cleaned in the first assignment image. Therefore, in the case where the region to be cleaned with the dust is determined in the first assignment image, the pixels in the gap region can be determined as the pixels belonging to the solar cell, but not the pixels belonging to the region to be cleaned, thereby avoiding mistakenly determining the gap region as the region to be cleaned and improving the accuracy of determining the region to be cleaned.

In the case where the method for determining the region to be cleaned is applicable to robots, the robots can automatically clean the region to be cleaned according to the determination results. In the case where the method for determining the region to be cleaned is applicable to a terminal or a server, the terminal or the server can communicate with the robot and inform the determined region to be cleaned to the robot, so that the robot can automatically clean the region to be cleaned.

Because the region to be cleaned is accurately determined, the robot can accurately clean the region to be cleaned and avoid the waste of resources caused by cleaning the regions outside the region to be cleaned.

Figure 2:
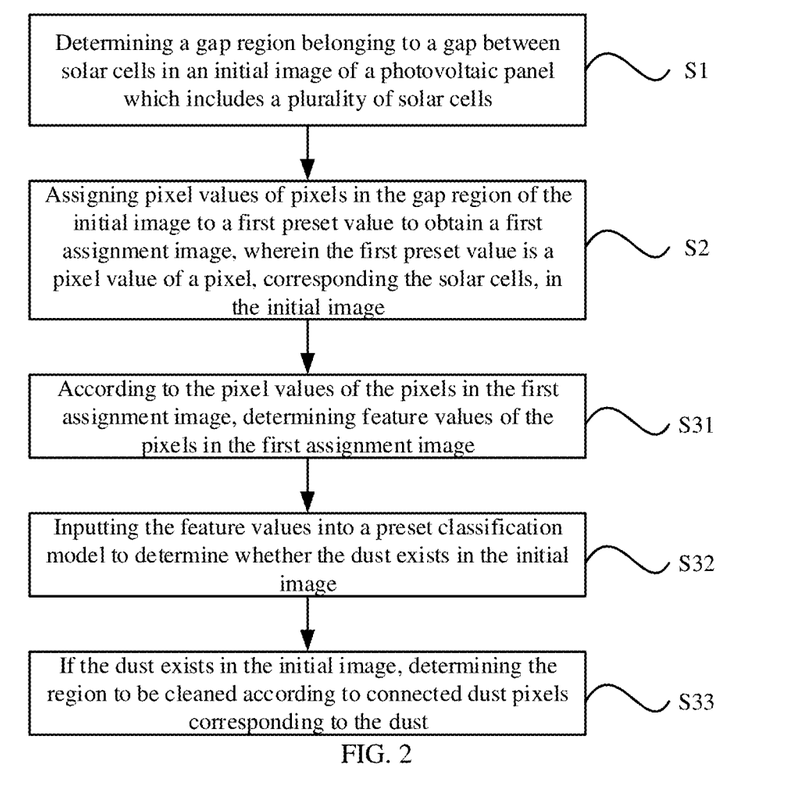
FIG. 2 is a schematic flow chart illustrating a method of determining a dust region, where the dust exists, in the first assignment image according to an embodiment of the present disclosure.

FIG. 2 is a schematic flow chart illustrating a method of determining a dust region, where the dust exists, in a first assignment image according to an embodiment of the present disclosure. As illustrated in FIG. 2, determining the region to be cleaned with the dust in the first assignment image includes the steps as follows.

S31, according to the pixel values of the pixels in the first assignment image, determining feature values of the pixels in the first assignment image.

In the following embodiments, for convenience of description, the embodiments are described by taking the case that the pixel values are grayscale values and the feature values are local binary pattern (LBP) values as an example, but it should be understood that the examples of pixel values and feature values are not limited to this case.

The LBP value is taken as an example, for a pixel, there are 8 adjacent pixels around the pixel as a center, and the grayscale value of the central pixel and the grayscale values of the adjacent 8 pixels can be compared. If the grayscale value of an adjacent pixel is greater than the grayscale value of the central pixel, mark this adjacent pixel with 1, else mark this adjacent pixel with 0, so that the related 8-bit binary number can be obtained for the central pixel, which can be used as the LBP value of the central pixel. Furthermore, according to the above method, the LBP value of each pixel can be obtained.

S32, inputting the feature values into a preset classification model to determine whether the dust exists in the initial image, if there is no dust, output a dust-free image; and if it is an image with dusty, continue to S33.

In an embodiment, the obtained feature values can be input into a preset classification model, the preset classification model can be obtained in advance by means of machine learning, deep learning, etc., and the type of the preset classification model can be selected as required, such as support vector machine (SVM) or neural network, etc. The preset classification model is used to determine whether there is the dust in the initial image according to the feature values of the pixels.

S33, if the dust exists in the initial image, determining the region to be cleaned according to connected dust pixels corresponding to the dust.

In an embodiment, the description "two dust pixels are connected" means that the two dust pixels are adjacent, which can be determined according to the pixel values of the pixels in the first assignment image. For example, the pixel values of the dust pixels can be assigned to a second preset value to obtain a second assignment image, so that the pixel values of the dust pixels in the second assignment image are the same and equal to the second preset value. Furthermore, it can be determined in the second assignment image that the region including pixels, whose pixel value is equal to the second preset value, is a connected region.

The second preset value can be 1, and the pixel value of the dust pixels, that do not correspond to the dust, can be assigned to 0, so the obtained second assignment image is a binary image, and in the binary image, the connected region including pixels with pixel values equal to 1 can be conveniently determined.

In an embodiment, the connected dust pixels can be regarded as one region to be cleaned, and there may be only one region to be cleaned or multiple regions to be cleaned in the initial image. If the amount of the connected dust pixels is too small, for example, less than the preset number, it can be determined that these connected dust pixels are not regions to be cleaned, so as to avoid some scattered pixels being misjudged as the dust due to noise in the initial image.

Figure 3:
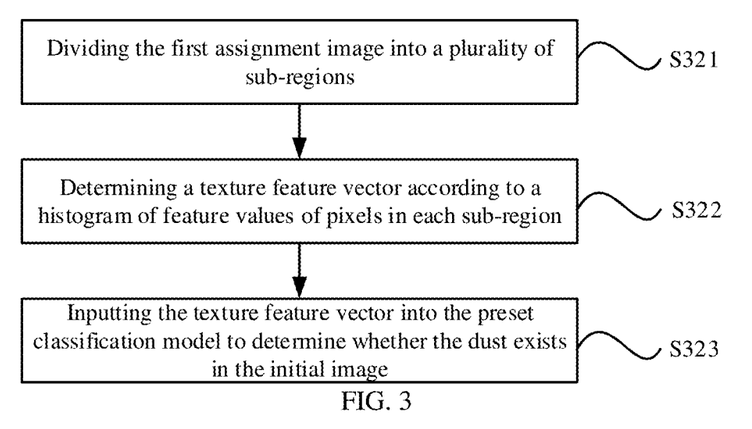
FIG. 3 is a schematic flow chart illustrating a method of inputting feature values into a preset classification model to determine whether the dust exists in the initial image according to an embodiment of the present disclosure.

FIG. 3 is a schematic flow chart illustrating a method of inputting feature values into a preset classification model to determine whether the dust exists in an initial image according to an embodiment of the present disclosure. As illustrated in FIG. 3, the method of inputting feature values into a preset classification model to determine whether dust exists in the initial image includes the following steps S321-S323:

S321, dividing the first assignment image into a plurality of sub-regions,

S322, determining a texture feature vector according to a histogram of feature values of pixels in each sub-region, and S323, inputting the texture feature vector into the preset classification model to determine whether the dust exists in the initial image.

In an embodiment, the first assignment image can be divided into a plurality of sub-regions, for example, 16*16 sub-regions, and respective sub-regions have the same area and the same shape.

Then, according to the feature values of the pixels in each sub-region, a histogram can be constructed and normalized. A horizontal axis of the histogram represents a value of the feature value, and a vertical axis represents a quantity, that is, the histogram represents the quantity statistics of the feature values of each value.

Then, the values of the vertical axis of each histogram are arranged, which are used as the texture feature vector of the whole image and input into the preset classification model for classification model training. According to an output result of the preset classification model, it is determined whether the dust exits in the initial image.

Therefore, the texture feature vector input into the preset classification model are obtained according to the histogram of the feature values of the pixels in sub-regions, and the amount of the sub-regions is less than the amount of all pixels, so a dimension of the texture feature vector composed of histograms of the sub-regions is less than the amount of all the pixels, therefor, compared with directly inputting the feature values of the pixels in the first assignment image into the preset classification model for calculation, the texture feature vector input into the preset classification model for calculation can reduce the calculation amount.

Figure 4:
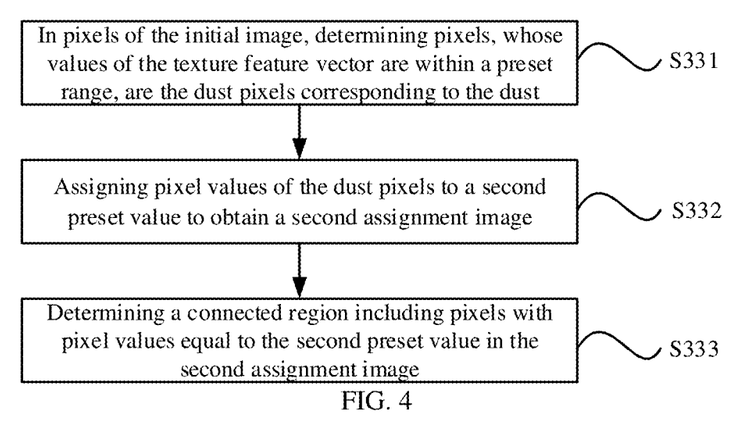
FIG. 4 is a schematic flow chart illustrating a method of determining the region to be cleaned according to connected dust pixels corresponding to the dust according to an embodiment of the present disclosure.

FIG. 4 is a schematic flow chart illustrating a method of determining a region to be cleaned according to connected dust pixels corresponding to the dust according to an embodiment of the present disclosure. As illustrated in FIG. 4, the method of determining the region to be cleaned according to the connected dust pixels corresponding to the dust includes the following steps S331-S333:

S331, in pixels of the initial image, determining pixels, whose values of the texture feature vector are within a preset range, are the dust pixels corresponding to the dust, S332, assigning pixel values of the dust pixels to a second preset value to obtain a second assignment image, and S333, determining a connected region including pixels with pixel values equal to the second preset value in the second assignment image.

In an embodiment, in the case where it is determined that the dust exists in the initial image, the dust pixels corresponding to the dust can be determined according to the value of texture feature vector. Specifically, pixels with the value of texture feature vector within a preset range can be determined as the dust pixels corresponding to the dust, and then the pixel values of the dust pixels are assigned to the second preset value to obtain the second assignment image, so that the pixel values of the dust pixels in the second assignment image are the same and equal to the second preset value. Furthermore, it can be determined in the second assignment image that the region including the pixel, whose pixel value is equal to the second preset value, is the connected region.

The second preset value can be 1, and the value of the dust pixels that do not correspond to the dust can be assigned to 0, so the obtained second assignment image is a binary image, and in the binary image, the connected region including pixels with pixel values equal to 1 can be conveniently determined.

Figure 5:
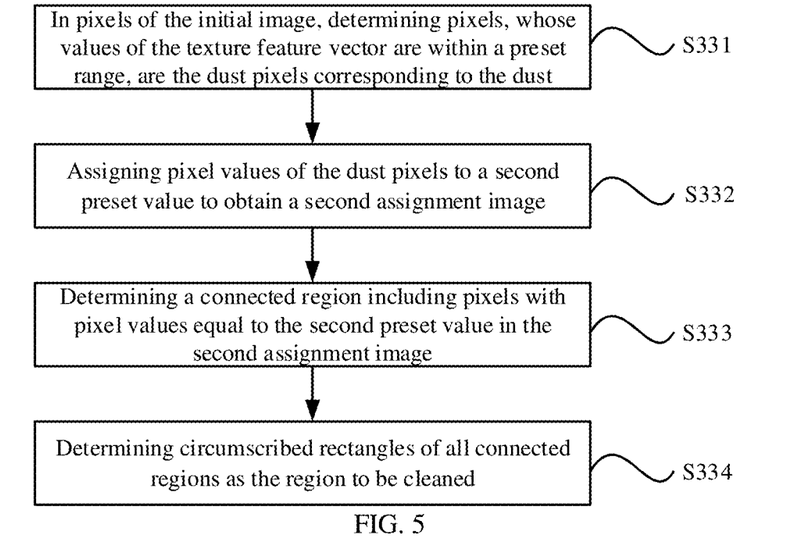
FIG. 5 is another schematic flow chart illustrating a method of determining the region to be cleaned according to connected dust pixels corresponding to the dust according to an embodiment of the present disclosure.

FIG. 5 is another schematic flow chart illustrating a method of determining the region to be cleaned according to the connected dust pixels corresponding to the dust according to an embodiment of the present disclosure. As illustrated in FIG. 5, the method of determining the region to be cleaned according to the connected dust pixels corresponding to the dust further includes the following step:

S334, determining circumscribed rectangles of all connected regions as the region to be cleaned.

In an embodiment, after the connected regions are determined, the circumscribed rectangles of all connected regions are determined as the region to be cleaned, and accordingly, the determined regions to be cleaned are rectangular regions which are connected, so that it is convenient that subsequent robots continuously clean the dust in the rectangular regions, without the need for robots to cross the connected regions for cleaning operation.

Figure 6:
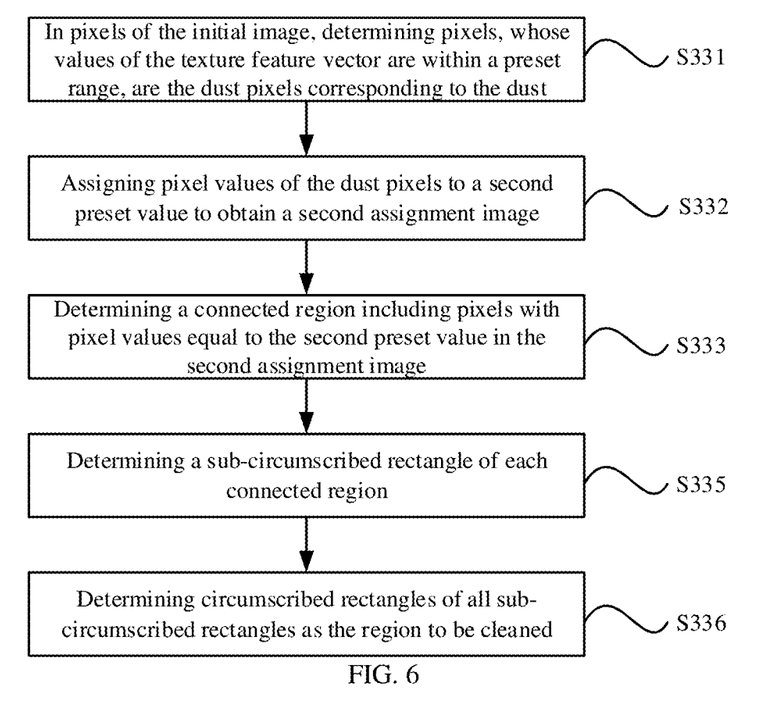
FIG. 6 is another schematic flow chart illustrating a method of determining the region to be cleaned according to connected dust pixels corresponding to the dust according to an embodiment of the present disclosure.

FIG. 6 is another schematic flow chart illustrating a method of determining a region to be cleaned according to the connected dust pixels corresponding to the dust according to an embodiment of the present disclosure. As illustrated in FIG. 6, the method of determining the region to be cleaned according to he connected dust pixels corresponding to the dust further includes the following steps:

S335, determining a sub-circumscribed rectangle of each connected region, and

S336, determining circumscribed rectangles of all sub-circumscribed rectangles as the region to be cleaned.

In an embodiment, after determining the connected regions, the sub-circumscribed rectangle can be determined for each connected region, and then the circumscribed rectangles of all the sub-circumscribed rectangles are determined as the region to be cleaned. Because the sub-circumscribed rectangles are determined first, and edges of the sub-circumscribed rectangles are all regular, it is convenient to find points in the edges of the sub-circumscribed rectangles as diagonal points of the circumscribed rectangle in the case of determining the circumscribed rectangles of all sub-circumscribed rectangles later, and it is not necessary to find points in the irregular edges of all connected regions as the diagonal points of the circumscribed rectangles, so it is convenient to determine the circumscribed rectangles.

In each sub-circumscribed rectangle, for example, the leftmost abscissa $x_{left}$, the rightmost abscissa $x_{right}$, the uppermost ordinate $y_{up}$ and the lowermost ordinate $y_{down}$ can be determined, and then the minimum value $x_{left\_min}$ is determined in all the leftmost abscissas $x_{left}$, the minimum value $y_{down\_min}$ is determined in all the lowermost ordinates $y_{down}$, the maximum value $x_{right\_max}$ is determined in all the rightmost abscissas $x_{right}$, and the maximum $y_{up\_max}$ is determined in all the uppermost ordinates $y_{up}$, and then the circumscribed rectangle is determined with $(x_{left\_min}, y_{down\_min})$ and $(x_{right\_max}, y_{up\_max})$ as the diagonal points.

Optionally, the feature values include local binary pattern values.

In another embodiment, the method further comprises accurately positioning the dust region in the region to be cleaned. The determined circumscribed rectangle is mapped onto the initial image, and the rectangular region is cut out in the initial image. And the clipping image is converted into a grayscale image. A gray threshold T is set, and the gray threshold T is used to distinguish between dust and the gap region of the solar cells. Pixel values of the pixels in the grayscale image smaller than threshold value T are assigned to 1 to form a binary image. The connected regions of the dust pixels in binary image are identified, and the set of circumscribed rectangles of the connected regions is calculated. Whether all circumscribed rectangles in the set intersect in pairs is determined, and the circumscribed rectangles which are intersected with each other is merged to obtain a set of merged circumscribed rectangle.

Finally, all the rectangles in the set of circumscribed sub-rectangles are mapped onto the initial image, the dust region is located, and the located dust region is output.

In this embodiment, because the subsequent processing is performed on the dust region which is cut out, instead of the whole initial image, the calculation speed and identification efficiency are improved. In addition, compared with the previous embodiment, this embodiment does not directly adopt the maximum region determined in LBP feature image as the region to be cleaned, but determines a plurality of disconnected rectangular regions containing the dust based on the identification result in the grayscale image, thus improving the accuracy of dust region identification and cleaning efficiency.

Figure 7:
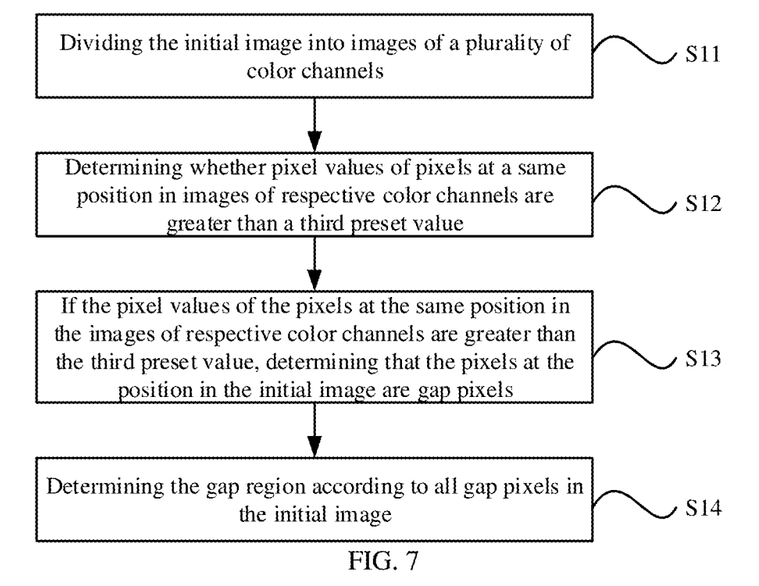
FIG. 7 is a schematic flow chart illustrating a method of determining a gap region belonging to a gap between solar cells in an initial image of a photovoltaic panel according to an embodiment of the present disclosure.

FIG. 7 is a schematic flow chart illustrating a method of determining a gap region belonging to a gap between solar cells in an initial image of a photovoltaic panel according to an embodiment of the present disclosure. As illustrated in FIG. 7, the method of determining the gap region belonging to the gap between the solar cells in the initial image of the photovoltaic panel includes the steps as follows.

S11, dividing the initial image into images of a plurality of color channels;

In an embodiment, the amount and types of color channels can be set as required, for example, three kinds of single color channels can be set, which are red channel, green channel and blue channel, respectively. Thus, three monochromatic sub-images are obtained.

S12, determining whether pixel values of pixels at a same position in images of respective color channels are greater than a third preset value.

In an embodiment, the third preset value can be set as required, for example, a value that can accurately distinguish gap pixels from the dust pixels can be selected and set, for example, in the case where the gray scale of pixel values is 0-255 (where 0 means the darkest and 255 means the brightest), the third preset value can be set to 165.

S13, if the pixel values of the pixels at the same position in the images of respective color channels (i.e., three monochrome sub-images) are greater than the third preset value, determining that the pixels at the position in the initial image are gap pixels.

S14, determining the gap region according to all gap pixels in the initial image.

In an embodiment, determining the gap pixels according to the pixel values of the plurality of color channels is more accurate than determining the gap pixels according to single grayscale value of the pixels.

Figure 8:
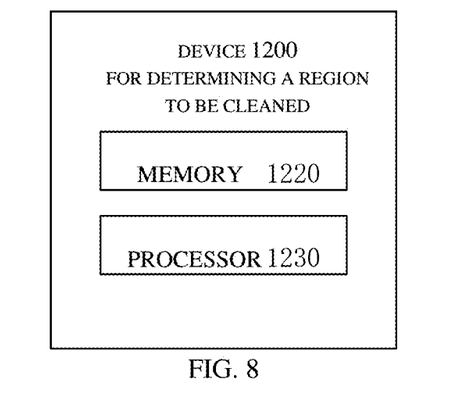
FIG. 8 is a schematic block diagram of a device for determining a region to be cleaned according to at least one embodiment of the present disclosure.

The embodiment of the present disclosure also provides a device for determining the region to be cleaned, which includes a processor, and the processor is configured to implement the steps in the method for determining the region to be cleaned according to any of the above embodiments. FIG. 8 is a schematic block diagram of a device for determining a region to be cleaned according to at least one embodiment of the present disclosure.

For example, as illustrated in FIG. 8, the device 1200 for determining the region to be cleaned includes a memory 1220 and a processor 1230. It should be noted that the components of the device 1200 for determining the region to be cleaned illustrated in FIG. 8 are only exemplary, not restrictive, and the device 1200 for determining the region to be cleaned may also have other components according to practical application requirements.

For example, the memory 1220 is used for storing computer-readable instructions non-temporarily; the processor 1230 is used for executing computer-readable instructions, and in the case where the computer-readable instructions are executed by the processor 1230, one or more steps of the method for determining the region to be cleaned according to any of the above embodiments are executed.

For example, the device 1200 for determining the region to be cleaned may also include other modules, such as an input-output module, a communication module, etc. The communication module is used to realize communication between the device 1200 for determining the region to be cleaned and other electronic device.

For example, the processor 1230 may control other components in the device 1200 for determining the region to be cleaned to perform desired functions. The processor 1230 may be a central processing unit (CPU), tensor processor (TPU), and other devices with data processing capability and/or program execution capability. A central processing unit (CPU) can be X86 or ARM architecture.

For example, the memory 1220 may include any combination of one or more computer program products, which may include various forms of computer-readable storage media, such as volatile memory and/or nonvolatile memory. The volatile memory may include random access memory (RAM) and/or cache, etc., for example. The nonvolatile memory may include, for example, read-only memory (ROM), hard disk, erasable programmable read-only memory (EPROM), portable compact disk read-only memory (CD-ROM), USB memory, flash memory, and the like. The one or more computer-readable instructions can be stored on the computer-readable storage medium, and the processor 1230 can execute the computer-readable instructions to realize various functions of the device 1200 for determining the region to be cleaned.

For example, components, such as the memory 1220, the memory 1230, and the touch screen 1240 can communicate with each other through a network. The network may include a wireless network, a wired network, and/or any combination of wireless and wired networks. The network can include local area network, internet, telecommunication network, Internet of Things based on internet and/or telecommunication network, and/or any combination of the above networks. The wired network can communicate by twisted pair, coaxial cable or optical fiber transmission, and the wireless network can communicate by 3G/4G/5G mobile communication network, Bluetooth, Zigbee or WiFi. The present disclosure is not limited to the type and function of the network here.

For example, as to the detailed description of the process of determining the region to be cleaned by the device 1200 for determining the region to be cleaned, reference may be made to the relevant description in the embodiment of the text identification method, and the repetition will not be repeated herein.

Figure 9:
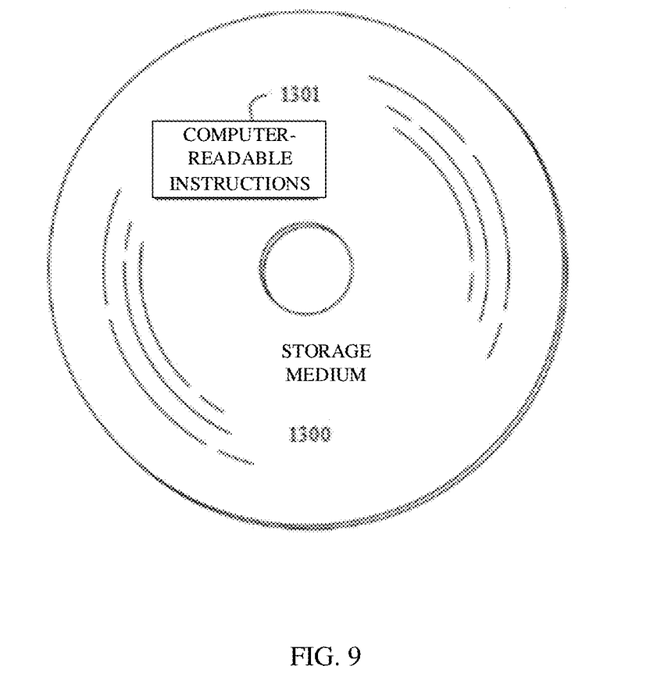
FIG. 9 is a schematic diagram of a storage medium according to at least one embodiment of the present disclosure.

At least one embodiment of the present disclosure also provides a storage medium. FIG. 9 is a schematic diagram of a storage medium provided by at least one embodiment of the present disclosure. For example, as illustrated in FIG. 9, one or more computer-readable instructions 1301 may be stored on a storage medium 1300 non-temporarily. For example, in the case where the computer-readable instructions 1301 are executed by a computer, one or more steps of the method for determining the region to be cleaned described above may be performed.

For example, the storage medium 1300 can be applied to the above-mentioned device 1200 for determining the region to be cleaned, for example, the storage medium 1300 can be the memory 1220 in the device 1200 for determining the region to be cleaned.

Figure 10:
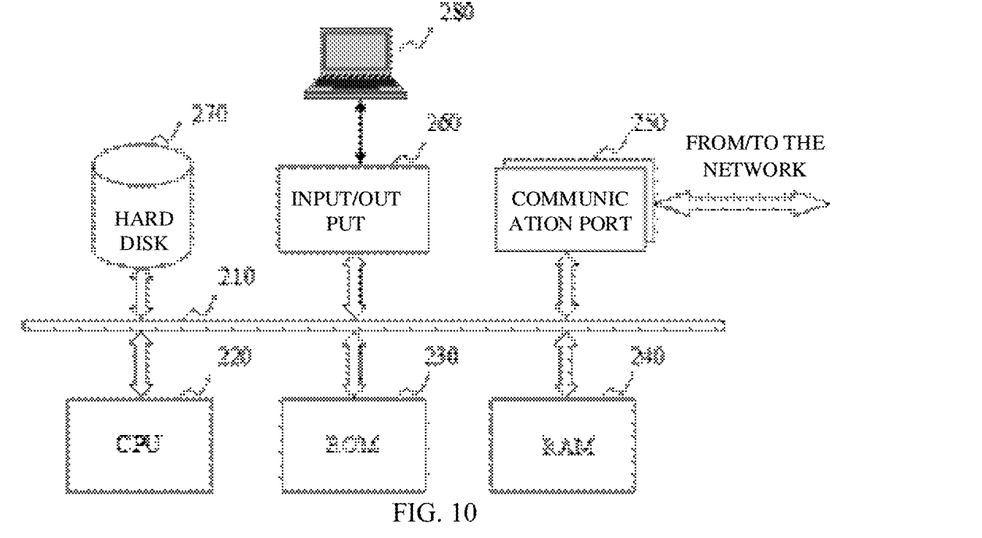
FIG. 10 is a schematic diagram of a hardware environment according to at least one embodiment of the present disclosure.

FIG. 10 shows a schematic diagram of a hardware environment provided by at least one embodiment of the present disclosure. The device 1200 for determining the region to be cleaned provided by the present disclosure can be applied to the internet system.

The device 1200 for determining the region to be cleaned involved in the present disclosure can be realized by using the computer system provided in FIG. 10. Such computer systems can include personal computers, notebook computers, tablet computers, mobile phones, personal digital assistants, smart glasses, smart watches, smart rings, smart helmets and any smart portable devices or wearable devices. The specific system in this embodiment uses the functional block diagram to explain a hardware platform including a user interface. This kind of computer device can be a general purpose computer device or a special purpose computer device. Both kinds of computer device can be used to realize the device 1200 for determining the region to be cleaned in this embodiment. A computer system may implement any of the components currently described that require information to determine a region to be cleaned. For example, a computer system can be implemented by a computer device through its hardware devices, software programs, firmware, and combinations thereof. For convenience, only one computer device is drawn in FIG. 10, but the related computer functions described in this embodiment to realize the information required for determining the region to be cleaned can be implemented by a group of similar platforms in a distributed manner, which disperses the processing load of the computer system.

As illustrated in FIG. 10, the computer system can include a communication port 250, which is connected with a network for realizing data communication, for example, the computer system can send and receive information and data through the communication port 250, that is, the communication port 250 can realize wireless or wired communication between the computer system and other electronic devices to exchange data. The computer system may also include a processor group 220 (i.e., the processor described above) for executing program instructions. The processor group 220 may be composed of at least one processor (e.g., CPU). The computer system may include an internal communication bus 210. A computer system may include different forms of program storage units and data storage units (i.e., the memory or storage medium described above), such as a hard disk 270, a read-only memory (ROM) 230, and a random access memory (RAM) 240, which can be used to store various data files used for computer processing and/or communication, and possible program instructions executed by the processor group 220. The computer system may also include an input/output component 260, which is used to realize the input/output data flow between the computer system and other components (e.g., the user interface 280, etc.).

Generally, the following devices can be connected to the input/output component 260, which includes input devices including, for example, touch screens, touch pads, keyboards, mice, cameras, microphones, accelerometers, gyroscopes, etc; output devices, such as a liquid crystal display (LCD), a speaker, a vibrator, and the like; storage devices, such as magnetic tapes, hard disks, etc.; and communication interface.

Although FIG. 10 shows a computer system with various devices, it should be understood that the computer system is not required to be provided with all the devices illustrated, and instead, the computer system may be provided with more or less devices.

The embodiment of the present disclosure also provides a dust cleaning device, which includes the device for determining the region to be cleaned according to the above embodiments.

The dust cleaning device can be a robot, and the robot can be used for automatically cleaning the region to be cleaned.

According to the above embodiments, by assigning the pixel values of the pixels in the gap region of the initial image to the first preset value, the pixel values of the pixels in the gap region in the obtained first assignment image can be equal to the pixel values of the pixels corresponding to the solar cells in the initial image, that is, in the first assignment image, the pixel values of the pixels in the gap region are the same as the pixel values of the pixels corresponding to the solar cells.

Because in the first assignment image, the pixel values of the pixels in the gap region are the same as the pixel values of the pixels corresponding to the solar cells, there is a big difference between the pixel values of the pixels in the gap region and the pixel values of the pixels in the region to be cleaned in the first assignment image. Therefore, in the case where the region to be cleaned with the dust is determined in the first assignment image, the pixels in the gap region can be determined as the pixels belonging to the solar cell, but not the pixels belonging to the region to be cleaned, thereby avoiding mistakenly determining the gap region as the region to be cleaned and improving the accuracy of determining the region to be cleaned.

In the present disclosure, the terms "first" and "second" are only used for descriptive purposes, and cannot be understood as indicating or implying relative importance. The term "plurality" means two or more, unless otherwise explicitly defined.

It should be understood that the present disclosure is not limited to the precise structure described above and illustrated in the drawings, and various modifications and changes can be made without departing from its scope. The scope of the present disclosure is limited only by the appended claims.

What is claimed is:

1. A method for determining a region to be cleaned, comprising:
    determining a gap region belonging to a gap between solar cells in an initial image of a photovoltaic panel, wherein the photovoltaic panel comprises a plurality of solar cells;
    assigning pixel values of pixels in the gap region of the initial image to a first preset value to obtain a first assignment image, wherein the first preset value is a pixel value of a pixel, corresponding the solar cells, in the initial image; and
    determining a region to be cleaned with dust in the first assignment image, wherein determining the region to be cleaned with the dust in the first assignment image comprises:
        according to the pixel values of the pixels in the first assignment image, determining feature values of the pixels in the first assignment image;
        inputting the feature values into a preset classification model to determine whether the dust exists in the initial image; and
        if the dust exists in the initial image, determining the region to be cleaned according to connected dust pixels corresponding to the dust.

2. The method according to claim 1, wherein inputting the feature values into the preset classification model to determine whether the dust exists in the initial image, comprises:
    dividing the first assignment image into a plurality of sub-regions;
    determining a texture feature vector according to a histogram of feature values of pixels in each sub-region; and
    inputting the texture feature vector into the preset classification model to determine whether the dust exists in the initial image.

3. The method according to claim 2, wherein determining the region to be cleaned according to the connected dust pixels corresponding to the dust, comprises:
    in pixels of the initial image, determining pixels, whose values of the texture feature vector are within a preset range, are the dust pixels corresponding to the dust;
    assigning pixel values of the dust pixels to a second preset value to obtain a second assignment image; and
    determining a connected region, comprising pixels with pixel values equal to the second preset value, in the second assignment image.

4. The method according to claim 3, wherein determining the region to be cleaned according to the connected dust pixels corresponding to the dust, further comprises:
    determining circumscribed rectangles of all connected regions as the region to be cleaned.

5. The method according to claim 4, further comprising:
    mapping the region to be cleaned onto the initial image, cutting out an image of the region to be cleaned, converting the image, which is cut out, into a grayscale image, determining a dust region based on the grayscale image, mapping the dust region onto the initial image, and outputting a located dust region.

6. The method according to claim 5, wherein determining the dust region based on the grayscale image, comprises:
    detecting the connected regions of the dust pixels, calculating circumscribed rectangles of the connected regions, and merging intersected circumscribed rectangles to obtain a set of final circumscribed rectangles, wherein the located dust region comprises regions, corresponding to all circumscribed rectangles in the set of final circumscribed rectangles, in the initial image.

7. The method according to claim 3, wherein determining the region to be cleaned according to the connected dust pixels corresponding to the dust, further comprises:
    determining a sub-circumscribed rectangle of each connected region; and
    determining circumscribed rectangles of all sub-circumscribed rectangles as the region to be cleaned.

8. The method according to claim 2, wherein the preset classification model comprises a support vector machine or a neural network.

9. The method according to claim 1, wherein the feature values comprise a local binary pattern value.

10. The method according to claim 1, wherein determining the gap region belonging to the gap between the solar cells in the initial image of the photovoltaic panel, comprises:
dividing the initial image into images of a plurality of color channels;
determining whether pixel values of pixels at a same position in images of respective color channels are greater than a third preset value;
determining that the pixels at the position in the initial image are gap pixels if the pixel values of the pixels at the same position in the images of respective color channels are greater than the third preset value; and
determining the gap region according to all gap pixels in the initial image.

11. A terminal for controlling a cleaning robot, configured to execute the method for determining the region to be cleaned according to claim 1, inform the region to be cleaned, which is determined, to the cleaning robot, and instruct the cleaning robot to automatically clean the region to be cleaned.

12. The device according to claim 11, wherein the processor is further configured to:
determine circumscribed rectangles of all connected regions as the region to be cleaned.

13. The device according to claim 11, wherein the processor is further configured to:
determine a sub-circumscribed rectangle of each connected region; and
determine circumscribed rectangles of all sub-circumscribed rectangles as the region to be cleaned.

14. A device for determining a region to be cleaned, comprising a processor and a storage medium storing instructions, when the instructions are executed by the processor, the processor is configured to:
determine a gap region belonging to a gap between solar cells in an initial image of a photovoltaic panel, wherein the photovoltaic panel comprises a plurality of solar cells;
assign pixel values of pixels in the gap region of the initial image to a first preset value to obtain a first assignment image, wherein the first preset value is a pixel value of a pixel, corresponding the solar cells, in the initial image; and
determine a region to be cleaned with dust in the first assignment image, wherein when the processor is configured to determine the region to be cleaned with the dust in the first assignment image, the processor is further configured to:
determine feature values of the pixels in the first assignment image according to the pixel values of the pixels in the first assignment image;
input the feature values into a preset classification model to determine whether the dust exists in the initial image; and
determine the region to be cleaned according to connected dust pixels corresponding to the dust if the dust exists in the initial image.

15. A dust cleaning device, configured to automatically clean the region to be cleaned which is determined by the device for determining the region to be cleaned according to claim 14.

16. The device according to claim 15, wherein the processor is further configured to:
in pixels of the initial image, determine pixels, whose values of the texture feature vector are within a preset range, are the dust pixels corresponding to the dust;
assign pixel values of the dust pixels to a second preset value to obtain a second assignment image; and
determine a connected region, comprising pixels with pixel values equal to the second preset value, in the second assignment image.

17. The device according to claim 14, wherein the processor is further configured to:
divide the first assignment image into a plurality of sub-regions;
determine a texture feature vector according to a histogram of feature values of pixels in each sub-region; and
input the texture feature vector into the preset classification model to determine whether the dust exists in the initial image.

18. The device according to claim 14, wherein the feature values comprise a local binary pattern value.

19. The device according to claim 14, wherein the processor is further configured to:
divide the initial image into images of a plurality of color channels;
determine whether pixel values of pixels at a same position in images of respective color channels are greater than a third preset value;
determine that the pixels at the position in the initial image are gap pixels if the pixel values of the pixels at the same position in the images of respective color channels are greater than the third preset value; and
determine the gap region according to all gap pixels in the initial image.

20. A non-transitory computer-readable storage medium, on which one or more computer-readable instructions are stored, wherein in a case where the computer-readable instructions are executed by a computer, the computer is configured to:
determine a gap region belonging to a gap between solar cells in an initial image of a photovoltaic panel, wherein the photovoltaic panel comprises a plurality of solar cells;
assign pixel values of pixels in the gap region of the initial image to a first preset value to obtain a first assignment image, wherein the first preset value is a pixel value of a pixel, corresponding the solar cells, in the initial image; and
determine a region to be cleaned with dust in the first assignment image, wherein determining the region to be cleaned with the dust in the first assignment image comprises:
determine feature values of the pixels in the first assignment image according to the pixel values of the pixels in the first assignment image;
input the feature values into a preset classification model to determine whether the dust exists in the initial image; and
determine the region to be cleaned according to connected dust pixels corresponding to the dust if the dust exists in the initial image.

\* \* \* \* \*